United States Patent
Hanaoka et al.

(10) Patent No.: US 9,352,985 B2
(45) Date of Patent: May 31, 2016

(54) ELECTOLYTIC APPARATUS, ICE MAKING APPARATUS, AND ICE MAKING METHOD

(71) Applicants: Soichiro Inamori, Tokyo (JP); Reijiro Inamori, Tokyo (JP)

(72) Inventors: Kokichi Hanaoka, Nagano (JP); Tadao Matsumoto, Nagoya (JP)

(73) Assignees: Soichiro Inamori, Tokyo (JP); Reijiro Inamori, Tokyo (JP)

( * ) Notice: Subject to any disclaimer, the term of this patent is extended or adjusted under 35 U.S.C. 154(b) by 161 days.

(21) Appl. No.: 14/187,928

(22) Filed: Feb. 24, 2014

(65) Prior Publication Data

US 2014/0246329 A1    Sep. 4, 2014

(30) Foreign Application Priority Data

Mar. 1, 2013    (JP) ................. 2013-040279

(51) Int. Cl.
*C02F 1/467* (2006.01)
*C02F 1/46* (2006.01)
*C02F 1/461* (2006.01)

(52) U.S. Cl.
CPC ............. *C02F 1/4672* (2013.01); *C02F 1/4606* (2013.01); *C02F 1/46104* (2013.01); *C02F 2001/46133* (2013.01); *C02F 2307/10* (2013.01)

(58) Field of Classification Search
None
See application file for complete search history.

(56) References Cited

U.S. PATENT DOCUMENTS

| | | | | |
|---|---|---|---|---|
| 4,452,049 A * | 6/1984 | Nelson | ....................... | F25C 5/10 249/200 |
| 5,059,296 A * | 10/1991 | Sherman | ............... | C02F 1/4602 204/229.8 |
| 6,398,927 B1 * | 6/2002 | Merzhauser | .......... | C02F 1/4606 204/242 |
| 6,458,257 B1 * | 10/2002 | Andrews | ............... | C02F 1/4672 204/262 |
| 2003/0146105 A1 * | 8/2003 | Shiue | .................... | A61L 2/0094 205/626 |
| 2005/0218083 A1 * | 10/2005 | Andrews | ................ | C02F 9/005 210/748.12 |
| 2008/0072615 A1 * | 3/2008 | Oguri | ........................ | F25C 1/00 62/340 |
| 2009/0120863 A1 * | 5/2009 | Salama | ............... | C02F 1/46109 210/192 |
| 2012/0152760 A1 * | 6/2012 | Robinson | .............. | C02F 1/4602 205/742 |

FOREIGN PATENT DOCUMENTS

JP    2007-85699 A    4/2007

* cited by examiner

*Primary Examiner* — Harry D Wilkins, III
(74) *Attorney, Agent, or Firm* — Norris McLaughlin & Marcus PA

(57) ABSTRACT

The present invention discloses an electrolytic apparatus comprising:
an electrolytic bath in which an anode (I) of a silver electrode—a cathode (II) of an inert electrode—an anode (III) of an inert electrode are arranged in this order in parallel to one another, and an electrode pair of the anode (I)—the cathode (II) and an electrode pair of the cathode (II)—the anode (III) have an electrical circuit configured to apply a potential of 2.07 V or more to the electrode pair of the cathode (II)—the anode (III) to supply electrolytic current, when independently supplying the electrolytic current;
an electrolytic raw water supply pipe configured to supply electrolytic raw water into the electrolytic bath; and
an electrolyzed water extraction pipe configured to extract the electrolyzed water in the electrolytic bath to the outside.

3 Claims, 3 Drawing Sheets

ELECTOLYTIC APPARATUS, ICE MAKING APPARATUS, AND ICE MAKING METHOD

BACKGROUND

1. Technical Field

The present invention relates to an electrolytic apparatus, an ice making apparatus incorporating the electrolytic apparatus, and an ice making method, in particular, to an electrolytic apparatus, an ice making apparatus, and an ice making method that suppress a growth of mold (fungi) or bacteria in the ice making apparatus over a subsequent operation of the apparatus during startup of the ice making apparatus.

2. Related Art

Methods of performing electrolysis using a silver electrode for an anode, and a silver electrode or an inert electrode or other electrodes for a cathode based on dilute electrolyte solution containing chloride or tap water as raw water to generate electrolytic silver or silver nitrate are widely known techniques. For a long time, silver has been said to have bactericidal capacity, used for control of mold and bacteria, such as anti-bacteria, and used from the viewpoint of hygiene, such as sterilized water (for example, JP 2007-85699 A).

The bacterial control using silver ions of JP 2007-85699 A, an electrolyzed water generation mechanism is installed on a raw water side of the ice making apparatus. The electrolyzed water generation mechanism generates silver ions by applying direct current to a pair of silver electrodes. An internal path and ice are sterilized by supplying the electrolyzed water (ice making water) containing silver ions into the ice making apparatus to make ice.

However, JP 2007-85699 A suggests the use of electrolytic raw water, that is, tap water obtained by performing dechlorination or the like as electrolytic solution. In addition, since the reaction is slow in silver ionized water, there are problems in that mold and bacteria are likely to occur in the apparatus during startup of the ice making apparatus, and slime due to the growth of mold and bacteria is likely to occur on a bottom surface of an ice making water tank.

SUMMARY

An object of the invention is to provide an electrolytic apparatus, an ice making apparatus incorporating the electrolytic apparatus, and an ice making method for solving the above-described problems of the prior art that suppress the growth of mold or bacteria in the ice making apparatus over a subsequent operation of the apparatus during startup of the ice making apparatus.

As a result of extensive studies on the above-described problems, the present inventors or the like have found the followings.

In the electrolytic apparatus, when a silver electrode is used in the anode, silver is dissolved as silver ions and reacts with chloride ions, nitric acid ions or the like of anion in the raw water, thereby producing silver salt such as silver chloride and silver nitrate. When the silver salt is silver chloride, most of silver chloride form insoluble colloidal salt due to low solubility. When the silver chloride is excessively generated, a precipitate is also formed. The electrolyzed water containing the insoluble colloidal silver chloride also has a function of realizing sterilization in a small amount, similarly to soluble silver ion electrolyzed water. However, since the reaction is slow, the time taken until mold and bacteria die is long.

In addition, since an oxidation-reduction potential of ozone is 2.07 V, ozone is generated by applying the potential of 2.07 V or more to the electrode using an inert electrode such as platinum or a platinum alloy in the anode to oxidize and electrolyze water. Electrolytic generation of ozone has been known for a long time, and ozone water obtained by dissolving ozone in water has been widely used. The electrolytic generation ozone water has been mainly used in the control of mold and bacteria such as sterilization, used in tap water, pool water or the like, and used in the control of mold and bacteria.

The inventors or the like configured an electrolytic apparatus in which three electrode plates are arranged in an order of an anode (I), a cathode (II), and an anode (III), a silver electrode is used in the anode (I), an inert electrode such as platinum and a platinum alloy is used in the cathode (II) and the anode (III), and an electrode pair of the anode (I)—the cathode (II) and an electrode pair of the cathode (II)—the anode (III) are set as electrical circuits for independently supplying electrolytic current, respectively. The inventions have found that when the apparatus is incorporated into an ice making apparatus, it is possible to generate ozone water during startup of the ice making apparatus, and generate electrolyzed water containing insoluble colloidal silver chloride during a subsequent operation, and as a result, it is possible to suppress growth of mold or bacteria in the ice making apparatus during startup of the ice making apparatus by ozone water, and it is possible to suppress subsequent growth of mold and bacteria by silver chloride colloidal water, and thus have accomplished the present invention.

To accomplish the above-described object, the invention is described below.

[1] An electrolytic apparatus comprising:

an electrolytic bath in which an anode (I) of a silver electrode—a cathode (II) of an inert electrode—an anode (III) of an inert electrode are arranged in this order in parallel to one another, and an electrode pair of the anode (I)—the cathode (II) and an electrode pair of the cathode (II)—the anode (III) have an electrical circuit configured to independently supply electrolytic current;

an electrolytic raw water supply pipe configured to supply electrolytic raw water into the electrolytic bath; and an electrolyzed water extraction pipe configured to extract the electrolyzed water in the electrolytic bath to the outside.

[2] An electrolytic apparatus comprising:

an electrolytic bath in which an anode (I) of a silver electrode—a cathode (II) of an inert electrode—an anode (III) of an inert electrode are arranged in this order in parallel to one another, the cathode (II) partitions the interior of the cell into a space having an electrode pair of the anode (I)—the cathode (II) and a space having an electrode pair of the cathode (II)—the anode (III) in a liquid-tight manner, and the electrode pair of the anode (I)—the cathode (II) and the electrode pair of the cathode (II)—the anode (III) have an electrical circuit configured to independently supply electrolytic current;

an electrolytic raw water supply pipe configured to supply the electrolytic raw water between the electrode pair of the anode (I)—the cathode (II) and between the electrode pair of the cathode (II)—the anode (III) in the electrolytic bath; and an electrolyzed water extraction pipe configured to extract the electrolyzed water between the electrode pair of the anode (I)—the cathode (II) and between the electrode pair of the cathode (II)—the anode (III) in the electrolytic bath to the outside.

[3] An electrolytic apparatus comprising:

an electrolytic bath in which an anode (I) of a silver electrode—a cathode (II) of an inert electrode—an anode (III) of an inert electrode are arranged in this order in parallel to one another, the cathode (II) partitions the interior of the cell into a space having an electrode pair of the anode (I)—the cathode (II) and a space having an electrode pair of the cathode (II)—the anode (III) in a liquid-tight manner, and the electrode pair of the anode (I)—the cathode (II) and the electrode pair of the cathode (II)—the anode (III) have an electrical circuit configured to independently supply electrolytic current;

a communicating pipe that connects one end side of the space having the electrode pair of the anode (I)—the cathode (II) and one end side of the space having the electrode pair of the cathode (II)—the anode (III) in the electrolytic bath;

an electrolytic raw water supply pipe configured to supply the electrolytic raw water to one of the other end side of the space having the electrode pair of the anode (I)—the cathode (II) and the other end side of the space having the electrode pair of the cathode (II)—the anode (III) in the electrolytic bath; and an electrolyzed water extraction pipe configured to extract the electrolyzed water outward to the other side of the other end side of the space having the electrode pair of the anode (I)—the cathode (II) and the other end side of the space having the electrode pair of the cathode (II)—the anode (III) in the electrolytic bath.

[4] An electrolytic apparatus comprising:
an ice making apparatus housing;
an ice stocker attached to a bottom of the ice making apparatus housing;
an ice making water tank disposed above the ice stocker;
a water spray tank disposed above the ice making water tank, and having a through-hole formed through a bottom wall of the water spray tank;
a freezing pipe which is inserted into the through-hole of the water spray tank at an interval spaced from the inner wall of the through-hole at one end side of the freezing pipe, and disposed toward the upper surface of the ice making water tank at the other end side of the freezing pipe;
a water supply pipe configured to connect the ice making water tank and the water spray tank, and interposing a water supply pump configured to supply a predetermined amount of ice making water in the ice making water tank to the water spray tank;
an ice making water supply pipe configured to supply the ice making water to the ice making water tank;
a medium supplying means configured to alternately supply refrigerant or heat medium into the freezing pipe; and
the electrolytic apparatus according to any one of [1] to [3] interposed in the ice making water supply pipe and/or the water supply pipe.

[5] An ice making method using the ice making apparatus according to [4], wherein
during startup of the ice making apparatus, electric current is applied to the electrode pair of the cathode (II)—the anode (III) to generate ozone water, and after a predetermined time of the startup of the ice making apparatus, the generation of ozone water is stopped and electric current is applied to the electrode pair of the anode (I)—the cathode (II) to generate silver chloride colloidal water.

According to the invention, the electrolytic apparatus is configured such that three electrode plates are arranged in the order of the anode (I), the cathode (II), and the anode (III), the silver electrode is used in the anode (I), and an inert electrode such as platinum and a platinum alloy is used in the cathode (II) and the anode (III), and the electrolytic current is independently applied to the electrode pair of the anode (I)—the cathode (II) and the electrode pair of the cathode (II)—the anode (III), respectively. Accordingly, it is possible to supply ozone water, and silver-containing water at arbitrarily timing in a single electrolytic apparatus. When the electrolytic apparatus is incorporated into the ice making apparatus, ozone water of sterilization immediate effect can be generated during startup of the ice making apparatus, and the electrolyzed water containing insoluble colloidal silver chloride having sterilization slow-acting properties can be generated during the subsequent operation. Thus, it is possible to suppress growth of mold and bacteria in the ice making apparatus during startup of the ice making apparatus by ozone water, and suppress preventing the subsequent growth of mold and bacteria by silver chloride colloidal water.

DETAILED DESCRIPTION

Hereinafter, the present invention will be described in detail.

An electrolytic apparatus of the invention will be described with reference to examples of FIGS. 1 to 4.

Figure 1:
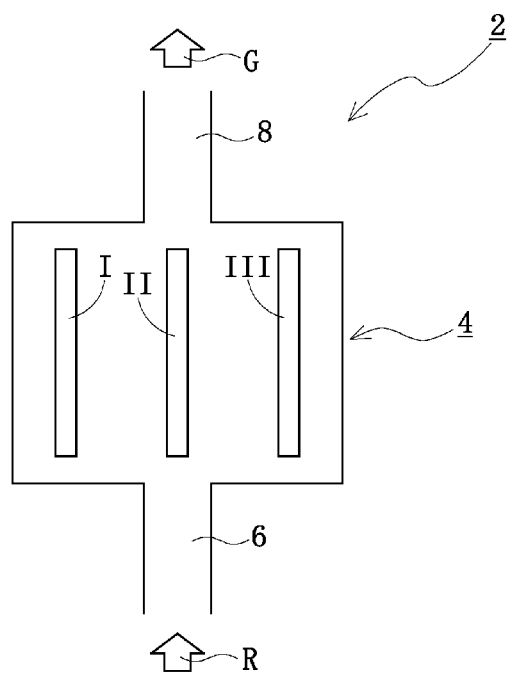
FIG. 1 is a schematic diagram illustrating a configuration of a positional relation among three electrode plates in one example of the electrolytic apparatus of the invention, and flows of electrolytic raw water and electrolyzed water.

FIG. 1 is a schematic diagram illustrating a configuration of a positional relation among three electrode plates in one example of the electrolytic apparatus of the invention, and flows of electrolytic raw water and electrolyzed water. In FIG. 1, an electrolytic apparatus 2 has an electrolytic bath 4, an electrolytic raw water supply pipe 6, and an electrolyzed water extraction pipe 8.

In the electrolytic bath 4, an anode (I) of a silver electrode—a cathode (II) of an inert electrode—an anode (III) of an inert electrode are arranged in this order in parallel to one another. An electrode pair of the anode (I)—the cathode (II) and an electrode pair of the cathode (II)—the anode (III) have an electrical circuit configured to independently supply electrolytic current, respectively. Electric current can be individually or simultaneously applied to the electrode pairs. As the inert electrode, it is possible to use platinum-based electrodes such as platinum or platinum alloy.

When raw water is taken in an R direction from the electrolytic raw water supply pipe 6, when only the anode (I) of the silver electrode and the cathode (II) of the platinum-based electrode are applied with electric current, silver ions are generated, the silver ions react with chlorine ions in the raw water, and thus most of the silver ions form an insoluble silver chloride colloid. Meanwhile, when only cathode (II) of the platinum-based electrode and anode (III) of the platinum-based electrode are applied with electric current, oxygen and ozone are generated from the anode. In FIG. 1, reference numeral G is an arrow indicating a flow direction of the electrolyzed water.

Figure 2:
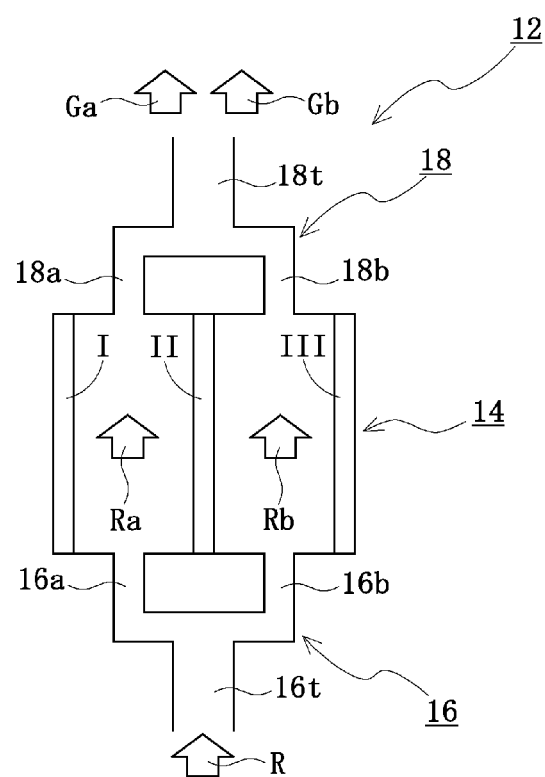
FIG. 2 is a schematic diagram illustrating a configuration of a positional relation among three electrode plates in another example of the electrolytic apparatus of the invention, and flows of electrolytic raw water and electrolyzed water.
Figure 3:
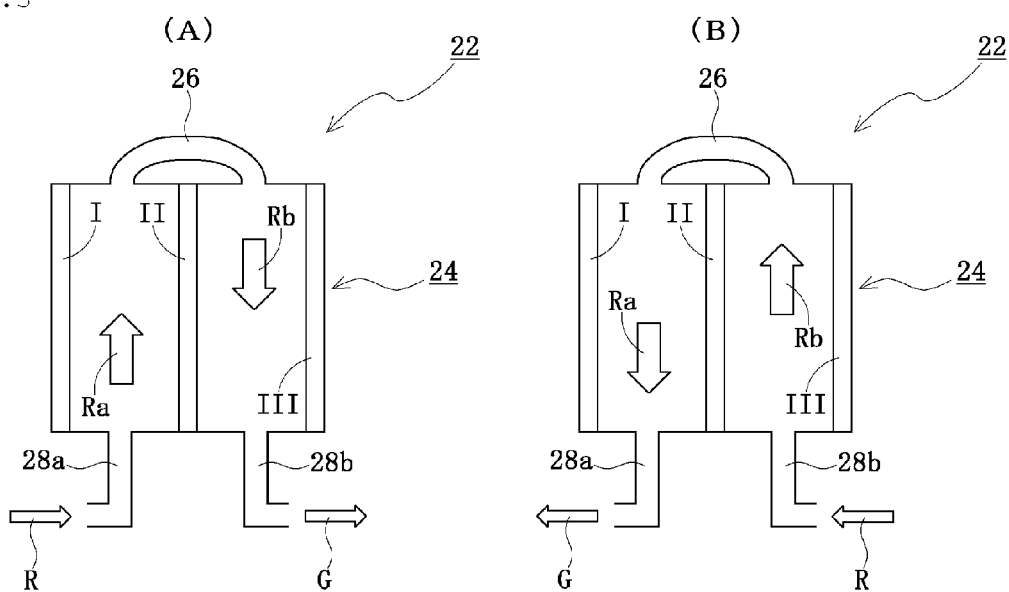
FIGS. 3A and 3B are schematic diagrams illustrating a configuration of a positional relation among three electrode plates in still another example of the electrolytic apparatus of the invention, and flows of electrolytic raw water and electrolyzed water, and the flows of electrolytic raw water and electrolyzed water being in opposite directions to each other in FIGS. 3A and 3B.

FIG. 2 is a schematic diagram illustrating a positional relation among three electrode plates in another example of the electrolytic apparatus of the invention, and flows of electrolytic raw water and electrolyzed water. In FIG. 2, an electrolytic apparatus 12 has an electrolytic bath 14, an electrolytic raw water supply pipe 16 including an electrolytic raw water supply main pipe 16t and branch pipes 16a and 16b thereof, and an electrolyzed water extraction pipe 18 including an electrolyzed water extraction main pipe 18t and branch pipes 18a and 18b thereof. In the electrolytic bath 14, the anode (I) of the silver electrode—the cathode (II) of the inert electrode—the anode (III) of the inert electrode are arranged in this order in parallel to one another, and the interior of the electrolytic bath 14 is divided into a space having the electrode pair of the anode (I)—the cathode (II) and a space having the electrode pair of the cathode (II)—the anode (III) the by cathode (II) in a liquid-tight manner.

In the electrolytic apparatus 12 thus configured, water taken in the R direction passes through the space having the electrode pair of the anode (I)—the cathode (II) and the space having the electrode pair of the cathode (II)—the anode (III) by divided flows Ra and Rb, respectively. During passage, in the example of FIG. 2, silver ionized water and ozone water are generated, respectively, based on the same principle as the example of FIG. 1.

That is, in the electrolytic apparatus 12, raw water is taken in the R direction from the electrolytic raw water supply pipe 16, then, when the raw water passes through only the anode (I) of the silver electrode and the cathode (II) of the platinum-based electrode, silver ionized water (divided flow Ga) is generated from the divided flow Ra of the raw water R, the silver ions react with chloride ions in the raw water, and most of the silver ions form an insoluble silver chloride colloid. Meanwhile, when the electric current is applied only to cathode (II) of platinum-based electrode and anode (III) of the platinum-based electrode, electrolyzed water (divided flow Gb) containing oxygen and ozone is generated from the divided flow Rb of the raw water R.

FIGS. 3A and 3B are schematic diagrams illustrating a configuration of a positional relation among three electrode plates in still another example of the electrolytic apparatus of the invention, and flows of electrolytic raw water and electrolyzed water. In both FIGS. 3A and 3B, an electrolytic apparatus 22 and an electrolytic bath 24 are illustrated.

In the electrolytic bath 24, the anode (I) of the silver electrode—the cathode (II) of the inert electrode—the anode (III) of the inert electrode are arranged in this order in parallel to one another, and the electrolytic bath 24 is divided into a space having the electrode pair of the anode (I)—the cathode (II) and a space having the electrode pair of the cathode (II)—the anode (III) by the cathode (II) in a liquid-tight manner.

The electrolytic apparatus 22 has the electrolytic bath 24, a communicating pipe 26 that connects one end side of the space having the electrode pair of the anode (I)—the cathode (II) and one end side of the space having the electrode pair of the cathode (II)—the anode (III), a connecting pipe 28a attached to the other end side of the space having the electrode pair of the anode (I)—the cathode (II), and a connecting pipe 28b attached to the other end side of the space having the electrode pair of the cathode (II)—the anode (III).

In FIGS. 3A and 3B, the flows of the electrolytic raw water and the electrolyzed water are in the opposite directions.

Therefore, in FIG. 3A, raw water is taken in the R direction from the connecting pipe 28a of the space having the electrode pair of the anode (I)—the cathode (II), and the electric current is applied only to cathode (II) of the platinum-based electrode and anode (III) of the platinum-based electrode. After passing through the space having the electrode pair of the anode (I)—the cathode (II) in a Ra direction, the taken raw water R passes through the space having the electrode pair of the cathode (II)—the anode (III) in a Rb direction via the communicating pipe 26. Electrolyzed water containing oxygen and ozone is generated from the raw water during passage in the Rb direction, and the electrolyzed water is extracted in a G direction via the connecting pipe 28b of the space having the electrode pair of the cathode (II)—the anode (III). In the example of FIG. 3A, the connecting pipe 28a plays the role of an electrolytic raw water supply pipe, and the connecting pipe 28b plays the role of an electrolyzed water extraction pipe.

On the other hand, in FIG. 3B, raw water is taken in the R direction from the connecting pipe 28b of the space having the electrode pair of the cathode (II)—the anode (III), and electric current is applied only to the anode (I) of the silver electrode and the cathode (II) of the platinum-based electrode. After passing through the space having the electrode pair of the cathode (II)—the anode (III) in the Rb direction, the taken raw water R passes through the space having the electrode pair of the anode (I)—the cathode (II) in the Ra direction via the communicating pipe 26. Silver ionized water is generated from the raw water during passage in the Ra direction, the silver ions react with the chlorine ions in the raw water, and most of the silver ions form insoluble silver chloride colloid. The obtained silver chloride colloidal water is extracted in the G direction via the connecting pipe 28a of the space having the electrode pair of the anode (I)—the cathode (II). In the example of FIG. 3B, the connecting pipe 28b plays the role of an electrolytic raw water supply pipe, and the connecting pipe 28a plays the role of an electrolyzed water extraction pipe.

Figure 4:
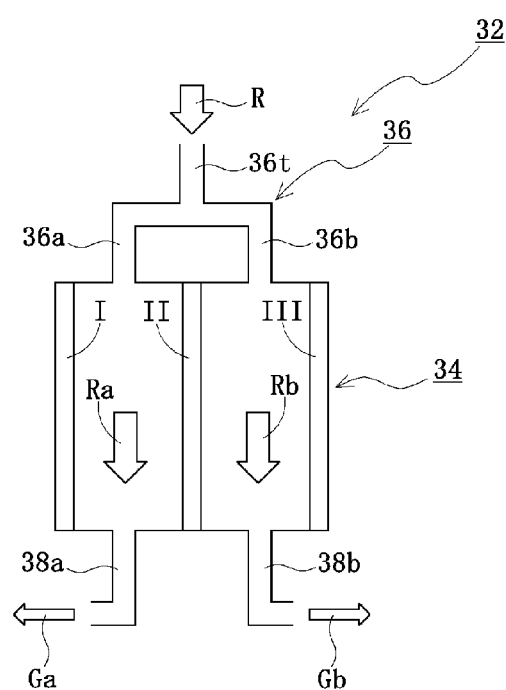
FIG. 4 is a schematic diagram illustrating a configuration of a positional relation among three electrode plates in still another example of the electrolytic apparatus of the invention, and flows of electrolytic raw water and electrolyzed water.

FIG. 4 is a schematic diagram illustrating a configuration of a positional relation among three electrode plates in still another example of the electrolytic apparatus of the invention, and flows of electrolytic raw water and electrolyzed water. In FIG. 4, an electrolytic apparatus 32 has an electrolytic bath 34, an electrolytic raw water supply pipe 36 including an electrolytic raw water supply main pipe 36t and branch pipes 36a and 36b thereof, a connecting pipe 38a of a space having an electrode pair of the anode (I)—the cathode (II), and a connecting pipe 38b of a space having an electrode pair of the cathode (II)—anode (III). In the electrolytic bath 34, the anode (I) of the silver electrode-the cathode (II) of the inert electrode—the anode (III) of the inert electrode are arranged in this order in parallel to one another, and the interior of the electrolytic bath 34 is divided into the space having the electrode pair of the anode (I)—the cathode (II) and the space having the electrode pair of the cathode (II)—the anode (III) by the cathode (II) in a liquid-tight manner.

In the electrolytic apparatus 32 configured as described above, electric current is simultaneously applied to the electrode pair of the anode (I) of the silver electrode and the cathode (II) of the platinum-based electrode, and the electrode pair of the cathode (II) of the platinum based electrode and the anode (III) of the platinum-based electrode. Therefore, when the raw water taken in the R direction passes through the space having the electrode pair of the anode (I)—the cathode (II) and the space having the electrode pair of the cathode (II)—the anode (III) by the divided flows Ra and Rb, silver ionized water and ozone water are simultaneously generated and separately extracted.

That is, in the electrolytic apparatus 32, when raw water is taken from the electrolytic raw water supply pipe 36 in the R direction, since electric current is applied to the anode (I) of the silver electrode and the cathode (II) of the platinum-based electrode, silver ionized water is generated from the divided flow Ra of raw water R, the silver ions react with the chlorine ions in the raw water, and most of the silver ions form an insoluble silver chloride colloid. The obtained silver chloride colloidal water is extracted in the Ga direction via the connecting pipe 38a of the space having the electrode pair of the anode (I)—the cathode (II).

Further, since electric current is also applied to the anode (II) of the platinum-based electrode and the cathode (III) of the platinum-based electrode, electrolyzed water containing oxygen and ozone is also generated from the divided flow Rb of raw water R, and extracted in the Gb direction via the connecting pipe 38b of the space having the electrode pair of the cathode (II)—the anode (III).

As illustrated in the examples of FIGS. 1 to 4, according to the electrolytic apparatus of the invention, it is possible to separately generate silver ionized water and ozone water in a single electrolytic bath, to generate mixed generation water of silver ions and ozone, or to separately generate silver ionized water and ozone water at the same time.

Figure 5:
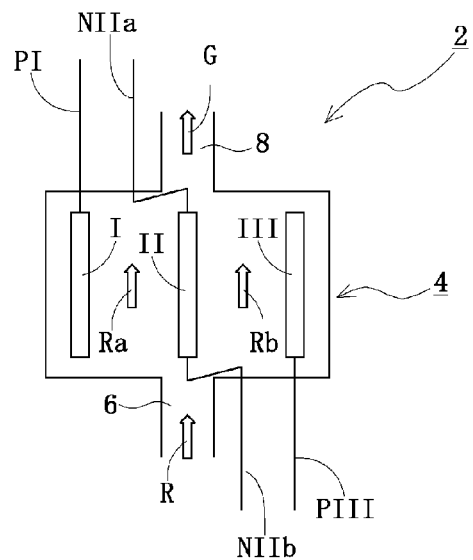
FIG. 5 is a schematic explanatory diagram illustrating of an operation of the electrolytic apparatus of the invention based on the example of FIG. 1.

FIG. 5 is a schematic explanatory diagram illustrating the operation of the electrolytic apparatus of the invention based on the example of FIG. 1.

As illustrated in FIG. 5, in three electrode plates including the anode (I) of the silver electrode, the cathode (II) of the platinum-based inert electrode, and the anode (III) of the platinum-based inert electrode in the electrolytic bath 4, the electrode pair of the anode (I)—the cathode (II), and the electrode pair of the cathode (II)—the anode (III) have an independent electrical circuit, respectively, and raw water is incorporated in the R direction from the electrolytic raw water supply pipe 6. The raw water may be suitable for drinking in a dilute electrolyte solution, and may be, for example, tap water or the like.

When silver ionized water is collected as electrolyzed water, by turning on the electrical circuit between a wiring PI of the anode (I) and a wiring NIIa of the cathode (II) and turning off the electrical circuit between a wiring NIIb of the cathode (II) and a wiring PIII of the anode (III) to perform electrolysis, it is possible to extract only silver ionized water in the G direction from the electrolyzed water extraction pipe 8 as the electrolyzed water.

On the other hand, when the electrical circuit between a wiring NIIb of the cathode (II) and a wiring PIII of the anode (III) is turned on, and the electrical circuit between a wiring PI of the anode (I) and a wiring NIIa of the cathode (II) is turned off, ozone generation is obtained, and it is possible to extract electrolyzed water in the G direction from the electrolyzed water extraction pipe 8 as ozone water.

In FIG. 5, Ra is an arrow indicating a direction of flow of electrolytic raw water passing through the space having the electrode pair of the anode (I)—the cathode (II), and Rb is an arrow indicating a direction of flow of electrolytic raw water passing through the space having the electrode pair of the cathode (II)—the anode (III).

Figure 6:
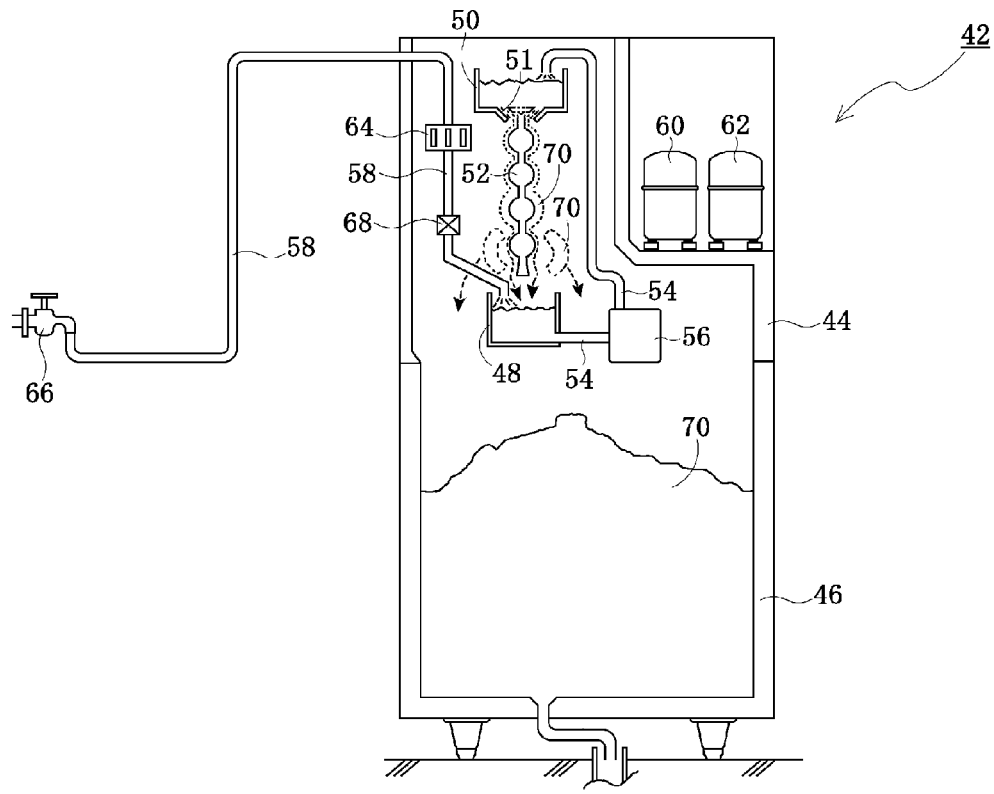
FIG. 6 is a schematic diagram illustrating a configuration of an example of an ice making apparatus of the invention incorporating the electrolytic apparatus of the invention.

FIG. 6 is a schematic diagram illustrating a configuration of an example of the ice making apparatus of the invention incorporating the electrolytic apparatus of the invention. In FIG. 6, an ice making apparatus 42 includes:
an ice making apparatus housing 44,
an ice stocker 46 attached to a bottom of the ice making apparatus housing 44,
an ice making water tank 48 disposed above the ice stocker 46,
a water spray tank 50 disposed above the ice making water tank 48, and having a through-hole 51 formed through a bottom wall of the water spray tank 50,
a freezing pipe 52 which is inserted into the through-hole 51 of the water spray tank 50 at an interval spaced from the inner wall of the through-hole 51 at one end side of the freezing pipe 52, and disposed toward the upper surface of the ice making water tank 48 at the other end side of the freezing pipe 52,
a water supply pipe 54 configured to connect the ice making water tank 48 and the water spray tank 50, and interposing a water supply pump 56 configured to supply a predetermined amount of ice making water in the ice making water tank 48 to the water spray tank 50,
an ice making water supply pipe 58 configured to supply the ice making water to the ice making water tank 48,
a medium supplying means configured to alternately supply refrigerant or heat medium into the freezing pipe 52 (including refrigerant supplying means 60 and a heat medium supplying means 62 in FIG. 6), and
the electrolytic apparatus 64 (interposed in the ice making water supply pipe 58 in FIG. 6) interposed in the ice making water supply pipe 58 and/or the water supply pipe 54.

An example of the ice making method of the invention using the ice making apparatus of the invention will be described below according to the example of FIG. 6.

As illustrated in FIG. 6, tap water applied to the ice making water supply pipe 58 from a faucet 66 is electrolyzed in the incorporated electrolytic apparatus 64 of the invention, converted to ice making water, and applied to the ice making water tank 48. A water supply electromagnetic valve 68 is preferably provided in the ice making water supply pipe 58.

In the electrolytic apparatus 64, as described above, during startup of the ice making apparatus 42, electric current is applied to the electrode pair of the cathode (II)—the anode (III) to generate ozone water, and the ozone water is used as the ice making water. After a predetermined period of time elapses from the startup of the ice making apparatus 42, the generation of ozone water is stopped and electric current is applied to the electrode pair of the anode (I)—the cathode (II) to generate silver chloride colloidal water, and the silver chloride colloidal water is used as the ice making water. A predetermined time after the startup of the ice making apparatus 42 is preferably in a range of 30 seconds to 5 minutes, and in a range of ozone concentration of 0.3 ppm to 1.2 ppm.

The ice making water is stored in the ice making water tank 48, and a predetermined amount thereof is applied to the water spray tank 50 provided above the ice making water tank 48 from the ice making water tank 48 by the water supply pump 56. On the bottom wall of the water spray tank 50, a through-hole 51 having an inverted trapezoidal cross-section including a through shaft to pass through the bottom wall, and one end of the freezing pipe 52 is inserted into the through-hole 51. The other end of the freezing pipe 52 reaches the upper surface of the ice making water tank 48.

A gap is formed between the through-hole 51 and one end of the freezing pipe 52 inserted thereto, and the ice making water in the water spray tank 50 flows down through the gap, and flows down along the surface of the freezing pipe 52. The freezing pipe 52 is hollow tubing, and a sphere and a cylinder are continuous as a shape of the tubing.

Refrigerant and heat medium are alternately applied to the freezing pipe 52. Ice making water flows down the surface of the freezing pipe 52 into which refrigerant such as cooling gas is conveyed and cooled, and freezes on the surface of the freezing pipe 52. The refrigerant is produced by the refrigerant supplying means 60 placed on a shelf of the upper housing 44 of the ice making apparatus 42, and conveyed into the freezing pipe 52 via a refrigerant conveying pipe (not illustrated).

When the sprayed ice making water is cooled on the surface of the freezing pipe 52 and a predetermined amount of ice 70 is grown, the water supply of the ice making water supply pipe 58 and the water supply pipe 54 is stopped. Thereafter, heat medium such as hot gas replacing the refrigerant is conveyed into the freezing pipe 52 to detach the ice 70 grown on the surface of the freezing pipe 52 from the freezing pipe 52 surface. Similarly to the refrigerant, the heat medium is produced by the heat medium supplying means 62 placed on the upper shelf of the housing 44 of the ice making apparatus 42, delivered into the freezing pipe 52 via a heat medium conveying pipe (not illustrated), and replaced with the refrigerant.

The ice 70 detached from the surface of the freezing pipe 52 is stored in the ice stocker 46 disposed below the housing 44 of the ice making apparatus 42.

Silver chloride colloid concentration in the electrolyzed water generated in the electrolytic apparatus 64 after a predetermined time of the startup of the ice making apparatus 42 is controlled by at least one of an electric conduction amount and an electric conduction time in the electrolytic apparatus 64. The electric conduction amount and the electric conduction time of the electrolytic apparatus 64 are adjusted by a combination of a timer, current or the like starting from the electric conduction timing of the respective components of the ice making apparatus 42, and the silver chloride colloid concentration of the electrolyzed water is preferably controlled to a range of 10 to 800 ppb.

The silver chloride colloid has a bactericidal action, and exhibits its effects at a low concentration. When the ice making water containing a predetermined amount of silver chloride colloid is sprayed and applied from the water spray tank 50, silver chloride colloidal water flowing along the surface of the freezing pipe 52 is partially scattered to the periphery to sterilize the attachment surface attached to the surface of the inner wall of the housing 44. In addition, when the ice 70 grown on the surface of the freezing pipe 52 is detached by heat medium, unfrozen silver chloride colloidal water is scattered to the periphery, and scattered to the top surface of the inner wall of the ice stocker 46 and the surface of the inner wall of the housing 44, which contributes to the sterilization of the surfaces thereof.

In the above description, the electrolytic apparatus 64 is attached to the supply pipe 58. However, the electrolytic apparatus 64 can be attached to any position of the water supply pipe 54 and the supply pipe 58 without being limited thereto. Furthermore, the electrolytic apparatus 64 may be attached to a plurality of positions.

A wall material in the housing 44 of the ice making apparatus 42, and inner and outer wall surfaces of the water spray tank 50 and the ice making water tank 48 are preferably an antibacterial material.

REFERENCE SIGNS LIST 2, 12, 22, 32, 64: electrolytic apparatus
4, 14, 24, 34: electrolytic bath
6, 16, 36: electrolytic raw water supply pipe
8, 18, 38: electrolyzed water extraction pipe
16t, 36t: electrolytic raw water supply main pipe
16a, 16b, 36a, 36b electrolytic raw water supply branch pipe
18t: electrolyzed water extraction main pipe
18a, 18b: electrolyzed water extraction branch pipe
26: communicating pipe that connects a space having an electrode pair of the anode (I)—the cathode (II) and a space having an electrode pair of the cathode (II)—the anode (III)
28a, 38a: connecting pipe of a space having an electrode pair of the anode (I)—the cathode (II)
28b, 38b: connecting pipe of a space having an electrode pair of the cathode (II)—the anode (III)
I: anode of a silver electrode
II: cathode of an inert electrode
III: anode of an inert electrode
PI: wiring of the anode (I)
NIIa, NIIb: wiring of the cathode (II)
PIII: wiring of the anode (III)
G, Ga, Gb: arrow indicating a flow direction of electrolyzed water
R, Ra, Rb: arrow indicating a flow direction of electrolytic raw water
42: ice making apparatus
44: ice making apparatus housing
46: ice stocker
48: ice making water tank
50: water spray tank
51: through-hole
52: freezing pipe
54: water supply pipe
56: water supply pump
58: ice making water supply pipe
60: refrigerant supplying means
62: heat medium supplying means
66: faucet
68: water supply electromagnetic valve
70: ice

What is claimed is:

1. An electrolytic apparatus comprising:
an electrolytic bath in which an anode (I) of a silver electrode—a cathode (II) of an inert electrode—an anode (III) of an inert electrode are arranged in this order in parallel to one another, and an electrode pair of the anode (I)—the cathode (II) and an electrode pair of the cathode (II)—the anode (III) have an electrical circuit configured to apply a potential of 2.07 V or more to the electrode pair of the cathode (II)—the anode (III) to supply electrolytic current, when independently supplying the electrolytic current to the electrode pair of the anode (I)—the cathode (II) and the electrode pair of the cathode (II)—the anode (III), respectively;
an electrolytic raw water supply pipe configured to supply electrolytic raw water into the electrolytic bath; and
an electrolyzed water extraction pipe configured to extract the electrolyzed water in the electrolytic bath to the outside.

2. An electrolytic apparatus comprising:
an ice making apparatus housing;
an ice stocker attached to a bottom of the ice making apparatus housing;
an ice making water tank disposed above the ice stocker;
a water spray tank disposed above the ice making water tank, and having a through-hole formed through a bottom wall of the water spray tank;
a freezing pipe which is inserted into the through-hole of the water spray tank at an interval spaced from the inner wall of the through-hole at one end side of the freezing pipe, and disposed toward the upper surface of the ice making water tank at the other end side of the freezing pipe;
a water supply pipe configured to connect the ice making water tank and the water spray tank, and interposing a water supply pump configured to supply a predetermined amount of ice making water in the ice making water tank to the water spray tank;

an ice making water supply pipe configured to supply the ice making water to the ice making water tank;

a medium supplying means configured to alternately supply refrigerant or heat medium into the freezing pipe; and an electrolytic apparatus interposed in the ice making water supply pipe and/or the water supply pipe;

wherein the electrolytic apparatus comprises:

an electrolytic bath in which an anode (I) of a silver electrode—a cathode (II) of an inert electrode—an anode (III) of an inert electrode are arranged in this order in parallel to one another, and an electrode pair of the anode (I)—the cathode (II) and an electrode pair of the cathode (II)—the anode (III) have an electrical circuit configured to apply a potential of 2.07 V or more to the electrode pair of the cathode (II)—the anode (III) to supply electrolytic current, when independently supplying the electrolytic current to the electrode pair of the anode (I)—the cathode (II) and the electrode pair of the cathode (II)—the anode (III), respectively;

an electrolytic raw water supply pipe configured to supply electrolytic raw water into the electrolytic bath; and an electrolyzed water extraction pipe configured to extract the electrolyzed water in the electrolytic bath to the outside.

3. An ice making method of using tap water in the electrolytic raw water in the ice making apparatus according to claim 2, wherein during a predetermined time after startup of the ice making apparatus, electric current is applied to the electrode pair of the cathode (II)—the anode (III) to generate ozone water, and after the predetermined time of the startup of the ice making apparatus, the generation of ozone water is stopped and electric current is applied to the electrode pair of the anode (I)—the cathode (II) to generate silver chloride colloidal water.

\* \* \* \* \*